(12) United States Patent
Aihara

(10) Patent No.: US 7,113,648 B1
(45) Date of Patent: Sep. 26, 2006

(54) IMAGE PROCESSING APPARATUS FOR CORRECTING CONTRAST OF IMAGE

(75) Inventor: Nobuhiro Aihara, Amagasaki (JP)

(73) Assignee: Minolta Co., Ltd., Osaka (JP)

( * ) Notice: Subject to any disclaimer, the term of this patent is extended or adjusted under 35 U.S.C. 154(b) by 549 days.

(21) Appl. No.: 09/782,253

(22) Filed: Feb. 14, 2001

(30) Foreign Application Priority Data

Feb. 28, 2000 (JP) .............................. 2000-051446

(51) Int. Cl.
*G06K 9/40* (2006.01)

(52) U.S. Cl. ....................................... 382/274; 382/254

(58) Field of Classification Search ................ 382/274, 382/254, 167; 345/617, 589; 358/3.01, 358/3.02, 518, 522
See application file for complete search history.

(56) References Cited

U.S. PATENT DOCUMENTS

| 5,046,118 | A | * | 9/1991 | Ajewole et al. ............. 382/169 |
| 5,450,502 | A | * | 9/1995 | Eschbach et al. ........... 382/169 |
| 5,581,370 | A | * | 12/1996 | Fuss et al. .................. 358/447 |
| 5,588,071 | A | * | 12/1996 | Schultz ........................ 382/168 |
| 6,049,626 | A | * | 4/2000 | Kim ............................ 382/167 |
| 6,463,173 | B1 | * | 10/2002 | Tretter ........................ 382/168 |
| 6,643,398 | B1 | | 11/2003 | Moriwaki |

FOREIGN PATENT DOCUMENTS

| JP | 05-012432 | 1/1993 |
| JP | 11-220683 A | 8/1999 |
| JP | 11-317875 A | 11/1999 |
| JP | 2000-057335 | 2/2000 |
| JP | 2000-59629 A | 2/2000 |

OTHER PUBLICATIONS

"*Fast Adaptive Contrast Enhancement Method For The Display of Gray-Tone Images*" by Naoki Kobayashi et al., (English/Japanese versions); D-II vol. J77-DII, No. 3, pp. 502-509.
"*Development of Optimum Contrast Enhancement Using Fuzzy Sets*" by Atsuhisa Saito et al., (English/Japanese versions); D-II vol. J73-D-II, No. 9, pp. 1504-1511.

* cited by examiner

*Primary Examiner*—Yon J. Couso
(74) *Attorney, Agent, or Firm*—Buchanan Ingersoll PC

(57) ABSTRACT

In a contrast correcting apparatus 1 which divides an image into unit regions and carries out a contrast correction for each of unit regions, a gray level histogram calculation section 201 generates gray level histograms of the image, and a scene judgment section 202 makes a judgment on the state of the image. When the result of the judgment shows that the image is in a state such as overexposure, underexposure, low contrast or high contrast, a region size determining section 204 sets a greater size as the size of the unit regions. Based upon the size of the unit regions thus determined and the amount of contrast correction determined by the contrast correction amount determining section 203, gray level transformation curves are formed for the respective unit regions, and by using these, the contrast corrections are carried out on the respective unit regions. With this method, it is possible to properly reduce the occurrence of unevenness in gray levels in an image that tends to arise in the case when the size of the unit regions is small although the amount of contrast correction (the amount of emphasis) is great.

19 Claims, 15 Drawing Sheets

IMAGE PROCESSING APPARATUS FOR CORRECTING CONTRAST OF IMAGE

This application is based on application No. 2000-051446 filed in Japan, the contents of which are hereby incorporated by reference.

BACKGROUND OF THE INVENTION

1. Field of the Invention

The present invention relates to a technique for correcting contrast of images.

2. Description of the Background Art

Conventionally, a contrast correcting operation for emphasizing contrast of images picked up by a digital camera or a scanner has been carried out. Here, in general, the contrast refers to a difference in gray levels between a background part and a main subject part in an image or a difference between the maximum gray level and the minimum gray level in an image; in this case, however, it is assumed that the contrast simply refers to the degree of differences between bright portions and dark portions distributed in an image. Therefore, in the following description, the correction of the contrast substantially corresponds to a process for correcting a gray level histogram of an image for transforming the gray levels in pixels.

For one example of contrast corrections, a method has been proposed, in which a gray level histogram is generated in a predetermined region around a pixel of interest that is to be corrected, and after the gray level histogram has been transformed, an accumulated histogram is generated, and the resulting accumulated histogram is utilized as a gray level transformation curve so as to transform the gray level of the pixel of interest.

However, in this method (hereinafter, referred to as "correction method with local histograms"), it is necessary to generate gray level histograms for respective pixels, and the resulting problem is that a great amount of calculations have to be made.

As to a modified method for the correction method with local histograms, another method has been proposed, in which an image is divided into a plurality of rectangular regions, and a gray level histogram is formed for each region, and this gray level histogram is transformed to an accumulated histogram, and by utilizing this as a gray level transformation curve, the gray levels of all the pixels within each region are transformed. With this method, the gray level transformation curves as many as the number of the divided regions are generated to correct the contrast, thereby making it possible to shorten the calculation time.

However, in the conventional contrast correction method which divides an image into a plurality of regions, and carries out a contrast correcting process on the basis of each region, the size of the region is fixed. As a result, in the case when gray level transformation curves are greatly different between the regions, the gray levels are greatly different on both of the sides of the border between the corresponding regions. Here, it is of course possible to alleviate the difference in gray levels between the regions by using linear interpolation, etc. however, in the case when gray levels are greatly different on both of the sides of the border, unevenness in gray levels become conspicuous even in an image after the correction.

SUMMARY OF THE INVENTION

The object of the present invention is to reduce unevenness in gray levels appropriately upon correcting the contrast of an image.

The present invention is directed to a computer-readable medium carring a program for correcting a contrast of an image.

According to an aspect of the present invention, execution of the program by a computer causes the computer to perform a process comprising the steps of: determining a size of unit regions each of which is a unit for correcting the contrast of the image; dividing the image into a plurality of unit regions in accordance with the size of unit regions; obtaining a plurality of gray level transformation characteristics corresponding to the plurality of unit regions, respectively; and correcting contrasts of the plurality of unit regions by using the plurality of gray level transformation characteristics.

The contrast is corrected appropriately and unevenness in gray levels is reduced by determining the size of unit regions properly.

Preferably, the size of unit regions is determined on the basis of distribution of a gray level histogram generated from the image, pickup conditions at the time of picking up the image, information input by an operator, an amount of contrast correction of the image, or a size of a region in which values of a predetermined color element are located within a predetermined range.

The present invention is also directed to a method and apparatus for correcting a contrast of an image.

These and other objects, features, aspects and advantages of the present invention will become more apparent from the following detailed description of the present invention when taken in conjunction with the accompanying drawings.

DESCRIPTION OF THE PREFERRED EMBODIMENTS

1. First Preferred Embodiment

Figure 1:
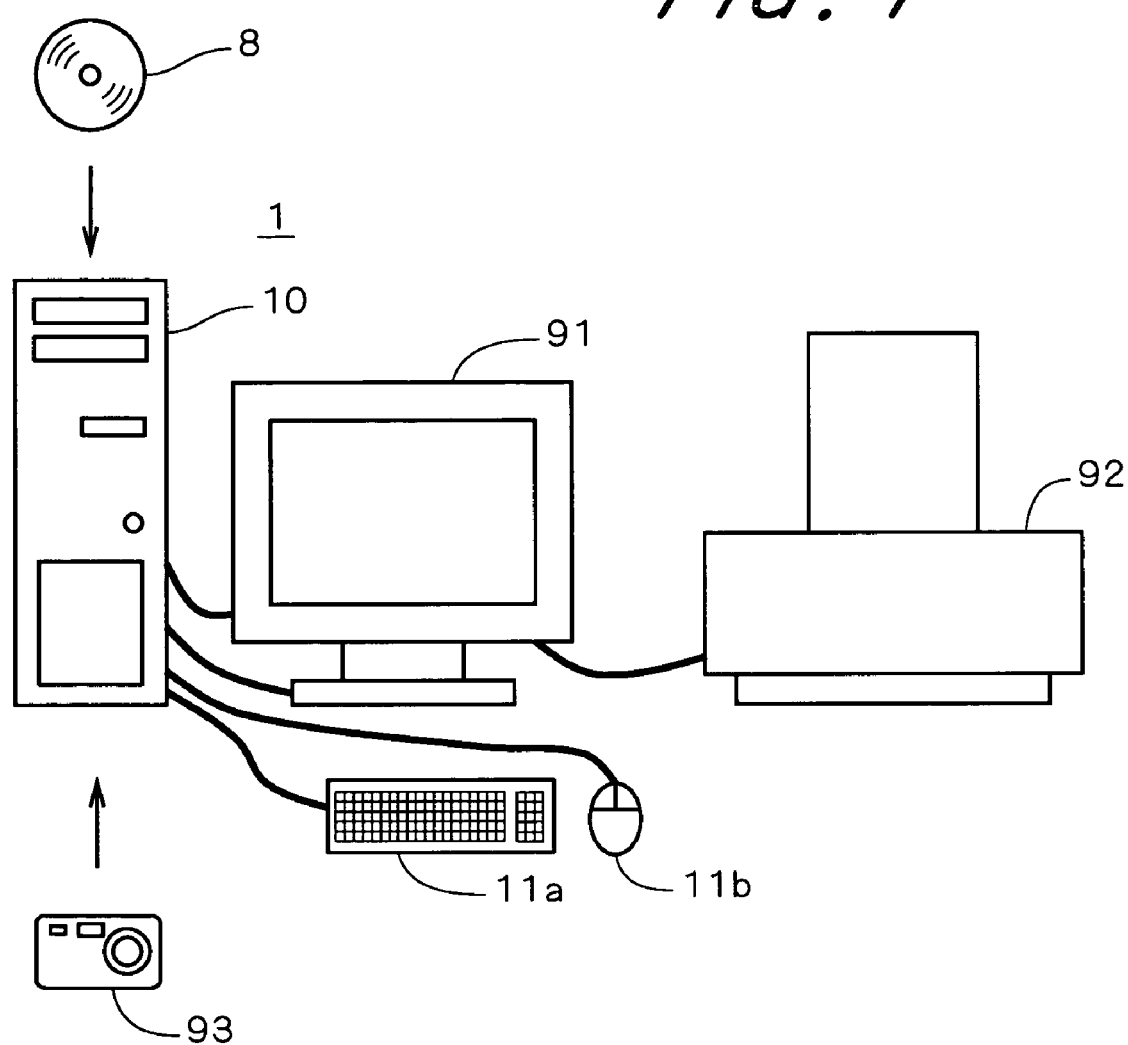
FIG. 1 is a drawing that shows a computer which serves as a contrast correcting apparatus, and its peripheral apparatuses.

FIG. 1 is a drawing that shows a contrast correcting apparatus 1 and its peripheral apparatuses in accordance with the first preferred embodiment. The contrast correcting apparatus 1 is an apparatus for correcting the gray levels of respective pixels in an image so as to provide proper contrast corresponding to the degree of differences between bright portions and dark portions in the image.

The contrast correcting apparatus 1 shown in FIG. 1 is realized mainly by a computer 10, and to the computer 10 are connected a key board 11a and a mouse 11b through which inputs from the operator are accepted. Moreover, a display 91 and a printer 92 are connected to the computer 10, and image data can be input from a digital camera 93 thereto through a memory card, a communication, cable etc.

In order to allow the computer 10, the key board 11a and the mouse 11b to function as the contrast correcting apparatus 1, a program for correcting contrast is preliminarily installed into the computer 10 through a recording medium 8, such as an optical disk, a magnetic disk, a magneto-optical disk and a memory card. Here, the program may be installed through a computer communication such as the Internet. In this case, a contrast correction program inside a recording device of a sender is transferred into the computer 10 through a Web server.

Figure 2:
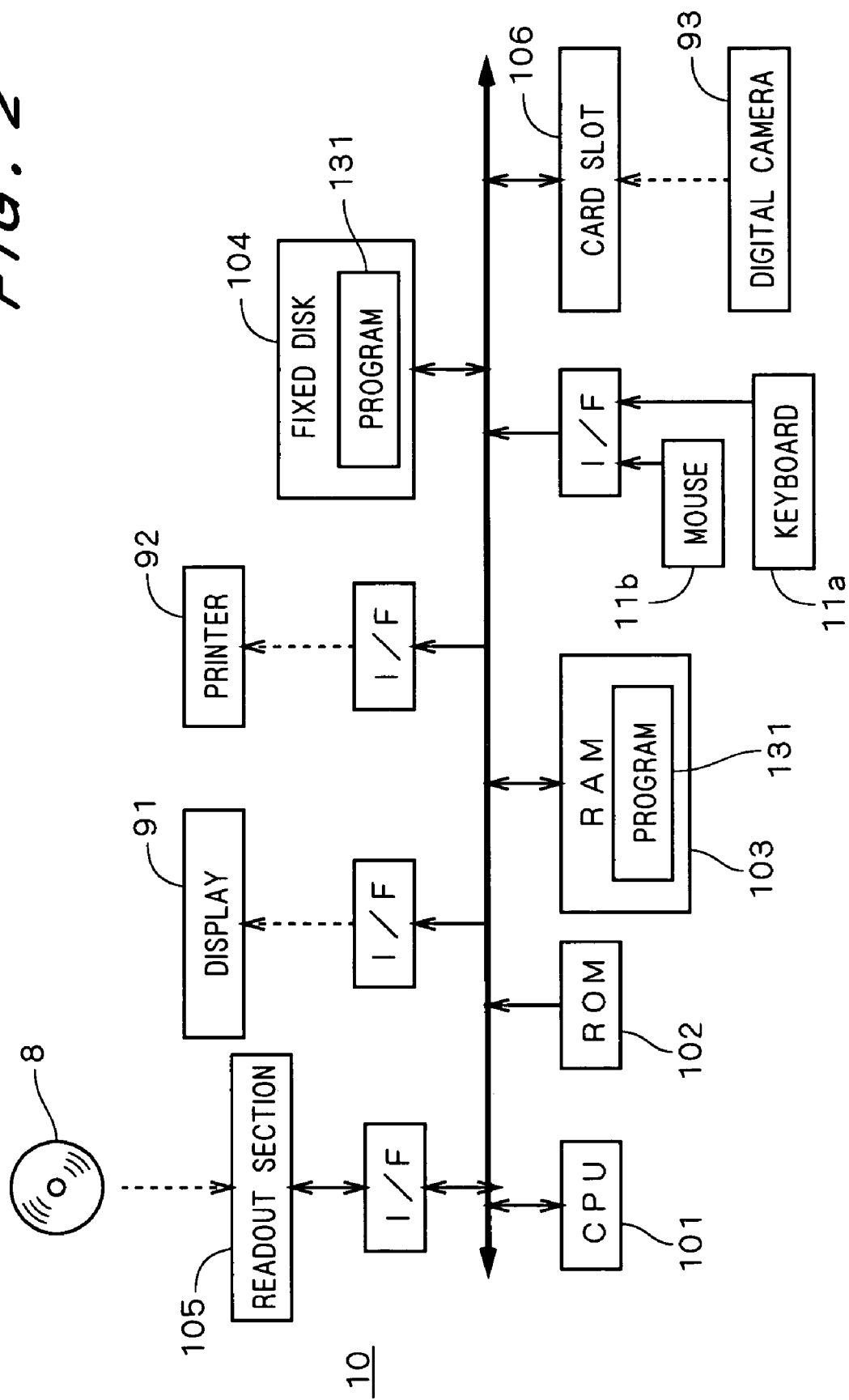
FIG. 2 is a block diagram that shows an inner construction of the computer.

FIG. 2 is a block diagram that shows an inner construction of the computer 10 together with its peripheral devices. As illustrated in FIG. 2, the computer 10, which has the same construction as a normal computer, is provided with a CPU 101 for executing various calculations, a ROM 102 for storing a basic program, a RAM 103 for storing a contrast correction program 131 and for providing a work area of the calculations, etc. that are connected to a bus line. Moreover, to the bus line are connected through an interface (I/F) on demand a display 91 and a printer 92 that are peripheral apparatuses, a fixed disk 104 for storing various programs including the contrast correction program 131, a readout section 105 for reading programs, etc. from the recording medium 8, a card slot 106 for transmitting and receiving image data to and from the digital camera 93 through a memory card, and a key board 11a and a mouse 11b for accepting inputs from the operator.

The contrast correction program 131 is taken into the fixed disk 104 through the readout section 105 (when obtained through communication, through a communication section placed separately), and the program 131 is copied to the RAM 103. Thus, the CPU 101 executes calculation processes in accordance with the program 131 so that the computer 10 to which the key board 11a and the mouse 11b are connected is allowed to function as the contrast correcting apparatus 1.

Figure 3:
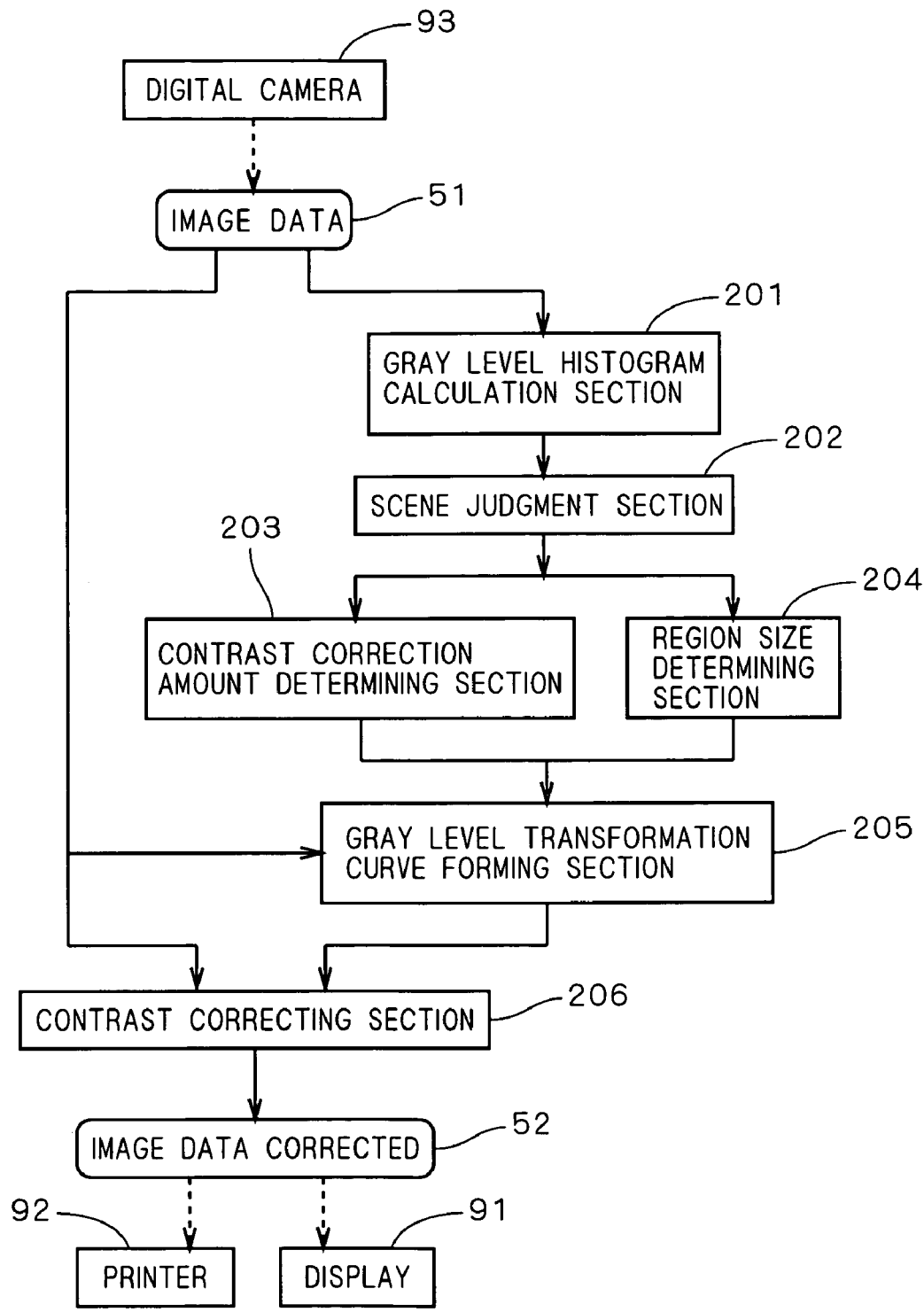
FIG. 3 is a block diagram that shows functional components of the contrast correcting apparatus in the first preferred embodiment.
Figure 4:
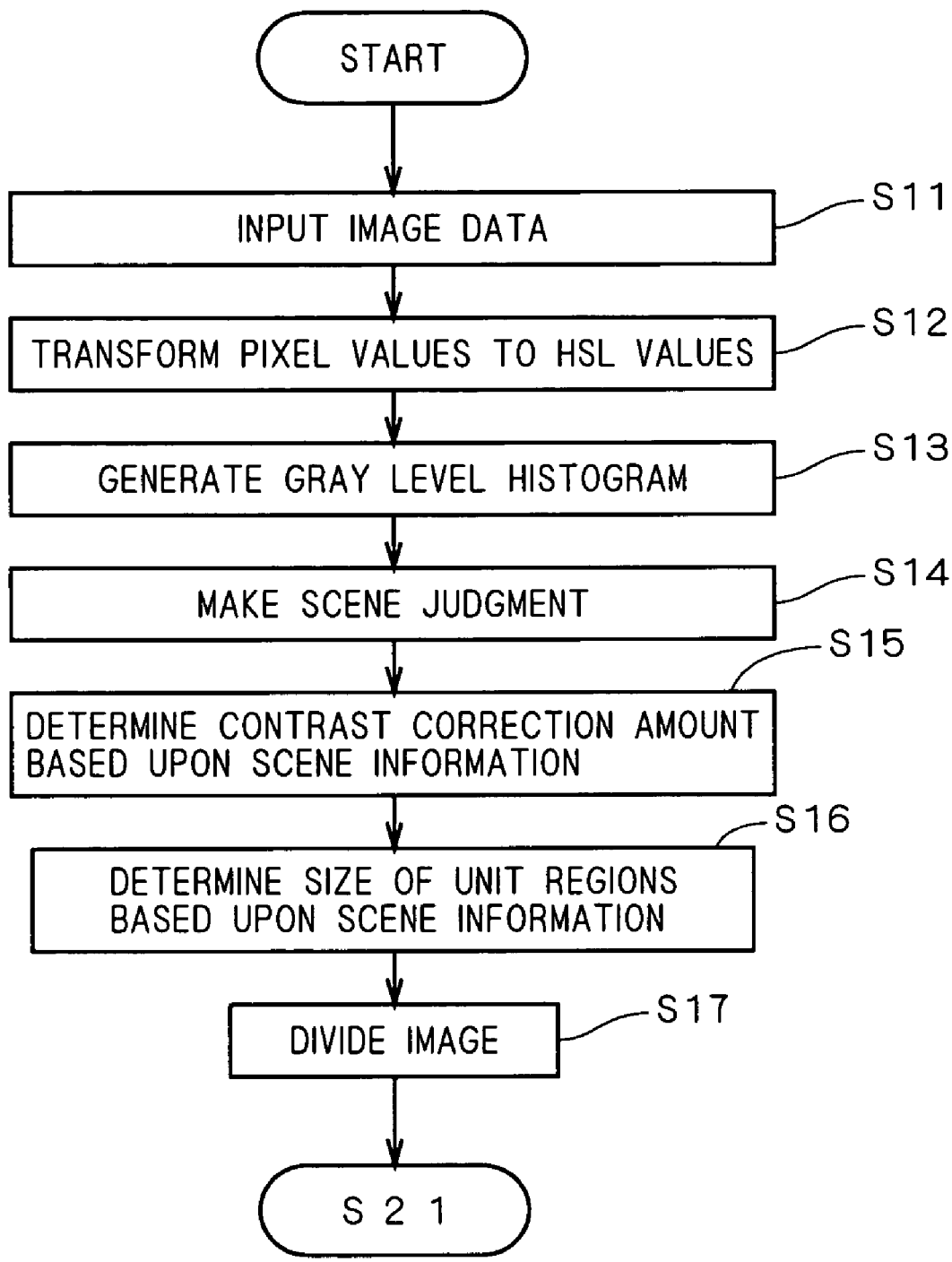
FIGS. 4 and 5 are flowcharts that show a sequence of processes in the contrast correcting apparatus in the first preferred embodiment.
Figure 5:
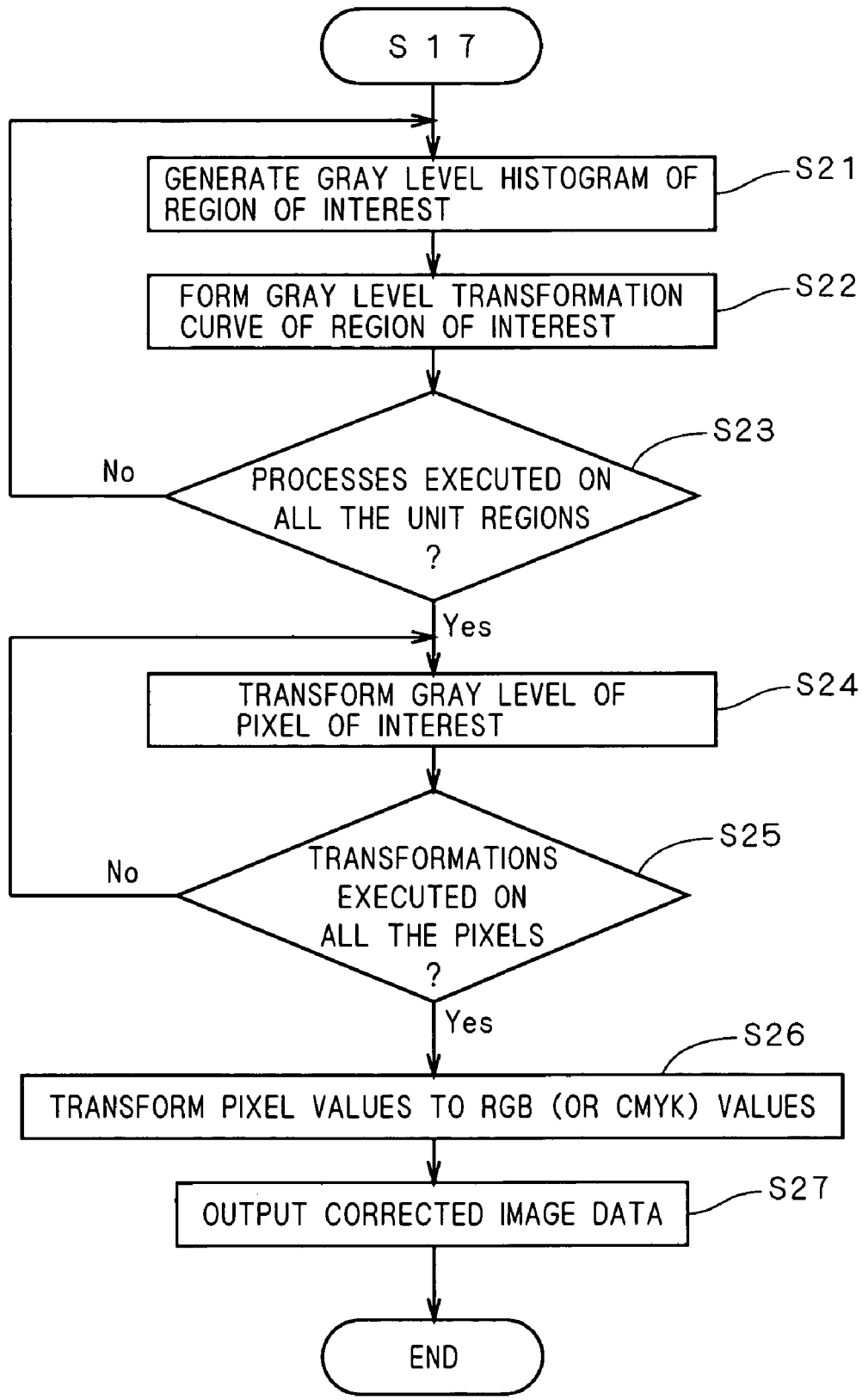

FIG. 3 is a block diagram that shows functional components realized by the CPU 101, ROM 102, RAM 103, etc. shown in FIG. 2, together with peripheral devices. In FIG. 3, data which are transmitted and received are also illustrated on demand. Moreover, FIGS. 4 and 5 are flowcharts that show a sequence of processes of the contrast correcting apparatus 1. Referring to FIGS. 3 to 5, an explanation will be given of the operation of the contrast correcting apparatus 1.

First, the contrast correcting apparatus 1 inputs image data 51 from the digital camera 93 to the RAM 103 (step S11). In this case, an image obtaining device other than the digital camera 93, such as a scanner, may of course be used, and image data 51, preliminarily stored in the fixed disk 104, may be transferred into the RAM 103.

Upon completion of the preparation of the image data 51, a gray level histogram calculation section 201 transforms pixel values of an image indicated by the image data 51 from RGB values to HSL values (including factors such as the hue, saturation, lightness (gray level)) (step S12). Then, a histogram (hereinafter, referred to as a "gray level histogram") of the number of pixels corresponding to the gray levels of the entire image is generated (step S13). Here, although an actual object to be processed by the CPU 101 is "image data", it is referred to as simply as "image" in the following explanation.

When the gray level histogram has been generated, a scene judgment section 202 makes a judgment as to a state of the image based upon the gray level histogram (step S14). The states of an image include underexposure, overexposure, low contrast, high contrast, etc., and in the following description, information indicating any of these image states is referred to as scene information. A plurality of pieces of scene information are preliminarily prepared, and the scene judgment section 202 properly makes a selection on the pieces of scene information based upon the gray level histogram.

Figure 6:
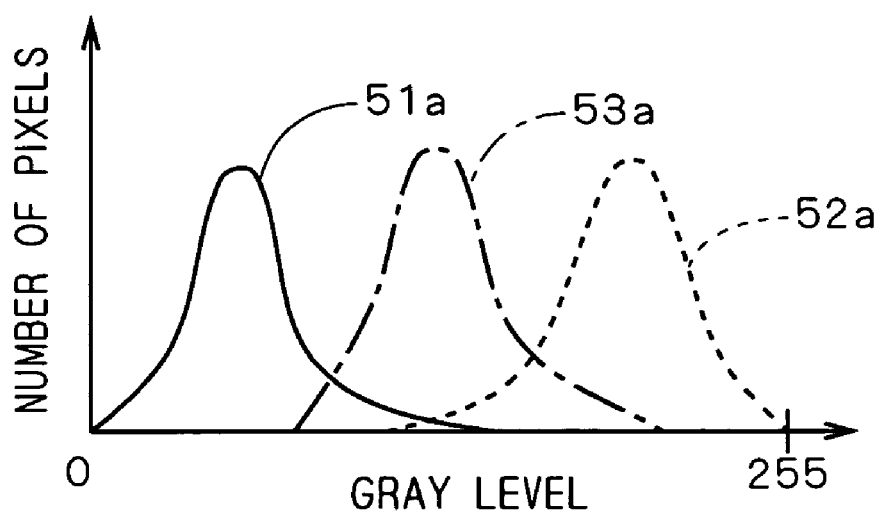
FIGS. 6 and 7 are drawings that show gray level histograms.
Figure 7:
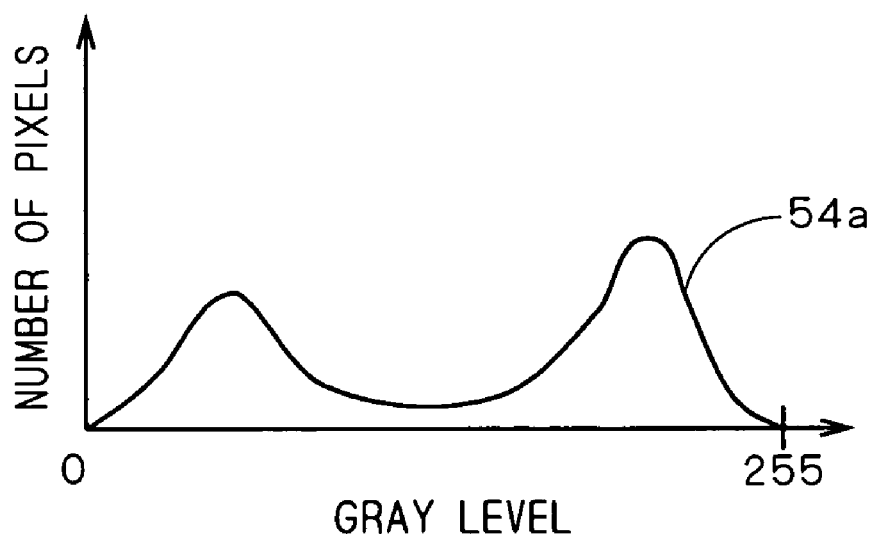

FIGS. 6 and 7 are drawings that show examples of the gray level histograms obtained from the image. In these figures, the minimum value of the gray levels is set to 0, and the maximum value thereof is set to 255. In general, in the case of an image having an appropriate contrast, with respect to gray level values, the gray level histogram exhibits a virtually constant state (or, a state in which the central portion is slightly raised). However, as is indicated by symbol 51a in FIG. 6, in the case when the histogram distribution is biased onto the low gray level region, the scene judgment section 202 makes a judgment that the image in question is in an underexposure state, and as is indicated by symbol 52a, in the case when the histogram distribution is biased onto the high gray level region, it makes a judgment that the image in question is in an overexposure state.

Moreover, as is indicated by symbol 53a, in the case when the dispersion of the histograms is small with a distribution biased onto the intermediate gray level region, the scene judgment section 202 makes a judgment that the image in question is in a low contrast state, and as is indicated by symbol 54a in FIG. 7, in the case when the histogram is distributed onto the high gray level region and low gray level region in a separated manner, it makes a judgment that the image is in a high contrast state.

The scene information selected by the scene judgment section 202 is sent to a contrast correction amount determining section 203 in which the amount of contrast correction is determined (step S15). The amount of contrast correction refers to a parameter indicating the degree of the contrast correction in an image; and in this case, for convenience of explanation, it is assumed that the same contrast correction amount is used for the entire image. Here, the image data 51 may also be input to the contrast correction amount determining section 203, and not only the scene information, but also the image data 51 may be used for determining the contrast correction amount.

The scene information is also sent to an region size determining section 204 where the size of divided regions to be used at the time of dividing an image is determined (step S16).

Figure 8:
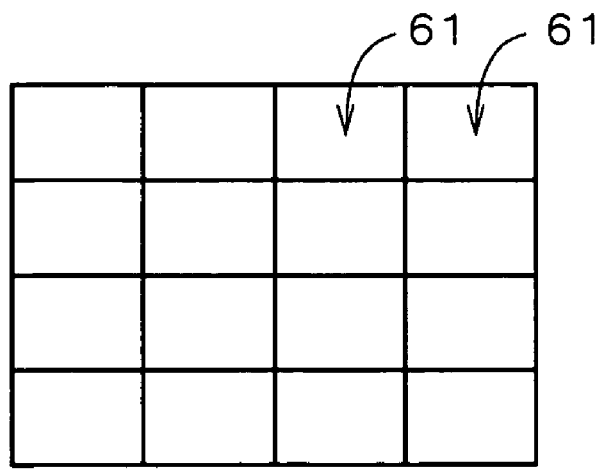
FIG. 8 is a drawing that shows unit regions.

FIG. 8 is a drawing that shows an example for dividing an image, and each of divided rectangular regions 61 forms a unit based on which the gray level is transformed by using the same gray level transformation characteristic (gray level transformation curve, which will be described later). In the following description, these regions, each forming the unit based on which the contrast correction is carried out, are referred to as "unit regions".

Thereafter, the size of the unit regions 61 thus determined is sent to a gray level transformation curve forming section 205 where the image is divided in accordance with the size of the unit regions 61 (step S117).

Figure 9:
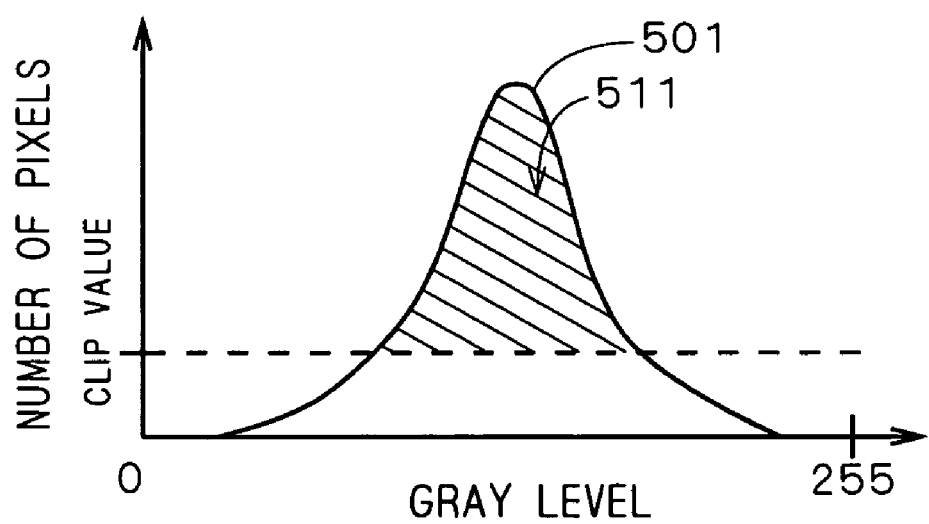
FIGS. 9 and 10 are drawings that explain states in which a gray level transformation curve is formed.

Next, one unit region 61 is specified as a region of interest, and a gray level histogram of the region of interest is generated by the gray level transformation curve forming section 205 (step S21). FIG. 9 is a drawing that shows an example of a gray level histogram of the region of interest. A clip value shown in FIG. 9 corresponds to the amount of contrast correction that is given from the contrast correction amount determining section 203 to the gray level transformation curve forming section 205, and the gray level transformation curve forming section 205 transforms the gray level histogram 501 by using the clip value.

Figure 10:
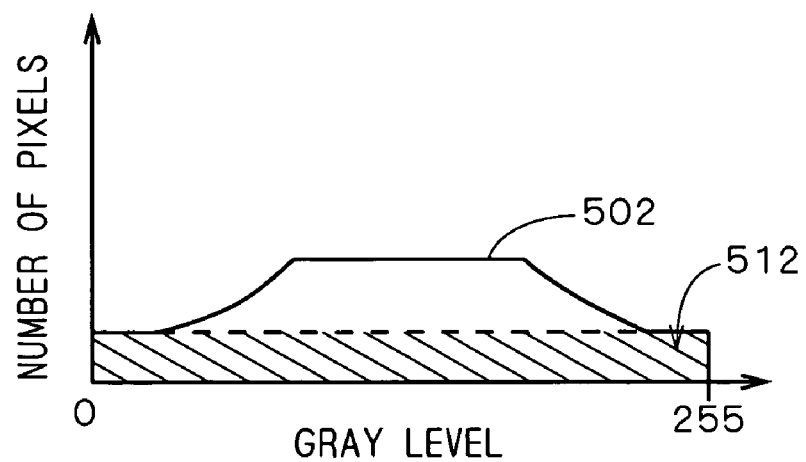

FIG. 10 is a drawing that shows the gray level histogram 502 that have been transformed. In FIG. 10, a region 512 indicated by parallel slanting lines has the same area as a region 511 that exceeds the clip value in FIG. 9. In other words, a gray level histogram 502 shown in FIG. 10 is formed by eliminating the region 511 from the gray level histogram 501 of FIG. 9 and adding the region 512 thereto. The operation for properly clipping the gray level histogram by a clip value is carried out in order to reduce an excessive contrast emphasis in the case when an accumulated histogram, which will be described later, is utilized as the gray level transformation curve.

Figure 11:
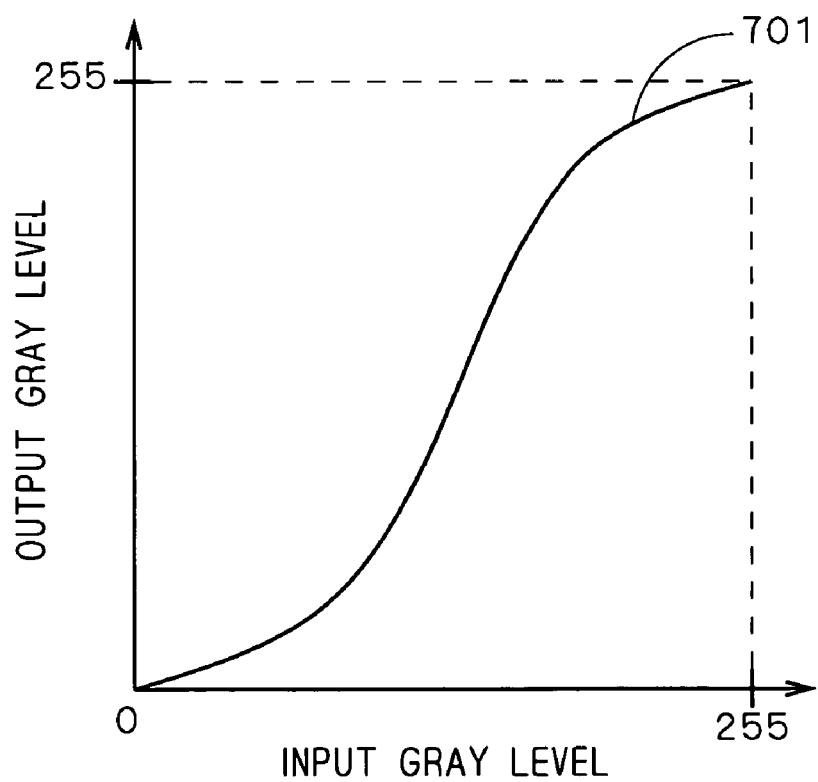
FIG. 11 is a drawing that explains the gray level transformation curve.

Successively, as illustrated in FIG. 11, an accumulated histogram 701 is formed with respect to the gray level histogram 502 by the gray level transformation curve forming section 205 (step S22). Then, in FIG. 11, input gray levels from 0 to 255 are plotted on the axis of abscissa while output gray levels from 0 to 255 are plotted on the axis of ordinate so that the accumulated histogram 701 is utilized as the gray level transformation curve for transforming the gray levels of the respective pixels within the region of interest. Here, in fact, the gray level transformation curve is formed as a transformation table.

When the gray level transformation curve has been formed with respect to the region of interest, the region of interest is switched to the next unit region 61, and calculations for the gray level transformation curve are again carried out. Thereafter, the switchover is successively made with respect to the regions of interest so that the gray level transformation curves are formed with respect to all the unit regions 61 (step S23).

When a plurality of gray level transformation curves have been formed, the gray levels of the respective pixels are transformed by using the corresponding gray level transformation curves. More specifically, one pixel of interest is determined, and the gray level of the pixel of interest is transformed by using the gray level transformation curve of the unit region 61 to which the pixel of interest belongs by a contrast correcting section 206 (step S24). Then, the switchover is successively made with respect to the pixels of interest so that the transformations of gray levels are carried out on the entire image, that is, the correction of contrast is carried out (step S25).

Here, since the gray level transformation curves are different according to the respective unit regions 61, an interpolation process may be carried out on the gray level transformation curve upon transformation of the gray levels so that the differences in gray levels may not become conspicuous on both sides of the borders of the unit regions 61.

Figure 12:
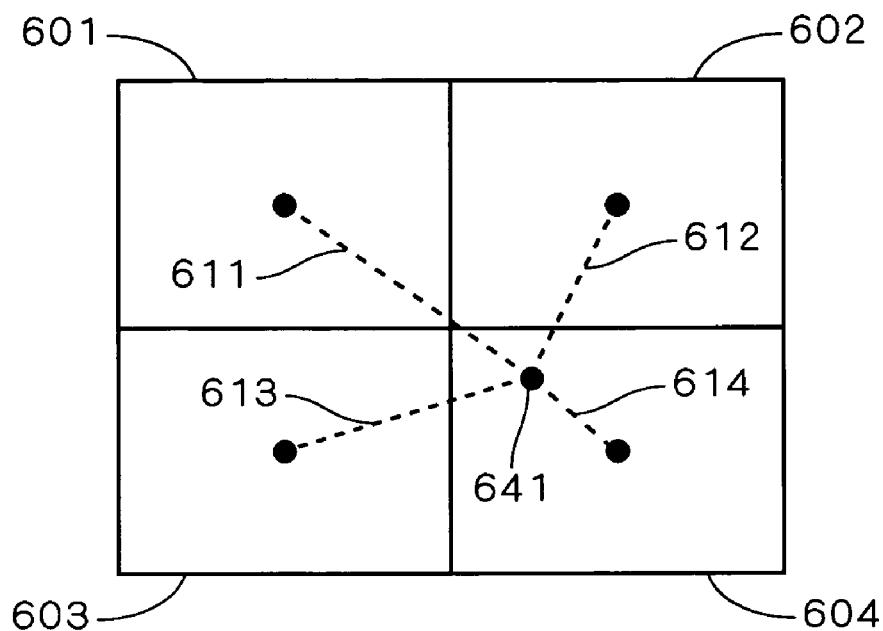
FIG. 12 is a drawing that explains a state in which the gray level transformation curve is interpolated.

FIG. 12 is a drawing that explains one example for the interpolation process of the gray level transformation curve. In FIG. 12, on the assumption that, upon transforming the gray level of a pixel 641 in a unit region 604, the gray level transformation curves of adjacent unit regions 601, 602, 603 and 604 are represented by functions f(x), g(x), h(x), i(x) (x: input gray level), and that distances from the centers of gravity of the respective unit regions 601, 602, 603 and 604 to the pixel 641 (distances indicated by symbols 611, 612, 613 and 614) are represented by a, b, c and d, the gray level transformation curve after the interpolation is found from the following expression 1:

$$\frac{d \cdot f(x) + c \cdot g(x) + b \cdot h(x) + a \cdot i(x)}{a + b + c + d} \qquad \text{[Expression 1]}$$

Such an interpolation process is carried out at the time of the gray level transformation so that the differences in gray levels on both sides of the borders of the unit regions can be alleviated. Here, with respect to the interpolation process, various other methods may of course be utilized.

Upon completion of the contrast correction on the image, pixel values of the respective pixels are transformed from the HSL values to values having a format suitable for the output apparatus. For example, in the case when the image is displayed on the display 91, the HSL values are transformed to RGB values, and in the case when it is printed by the printer 92, they are transformed to CMYK values (step S26). Thereafter, the image data 52 representing the image that has been corrected is output to a specified output apparatus (step S27).

In the above description, an explanation has been given of the operation of the contrast correcting apparatus 1. Next, an explanation will be given of the functions of the contrast correction amount determining section 203 and the region size determining section 204 shown in FIG. 3.

Figure 13:
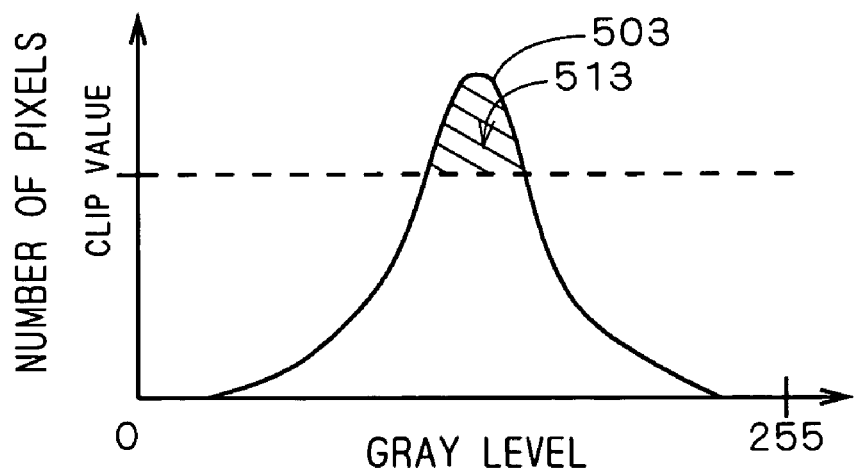
FIGS. 13 and 14 are drawings that explain states in which a gray level transformation curve is formed.
Figure 14:
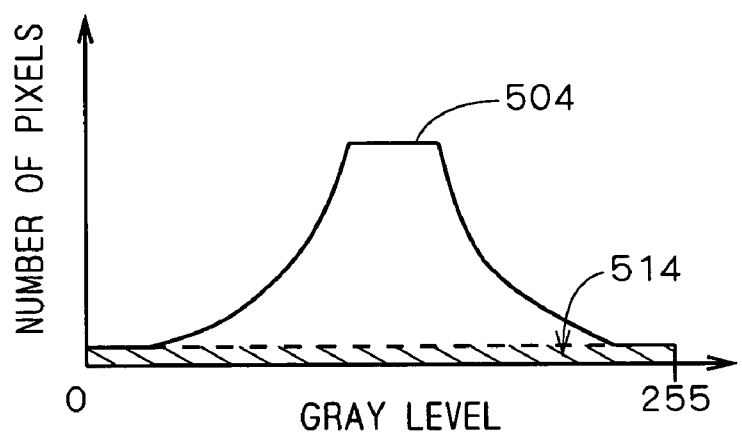
Figure 15:
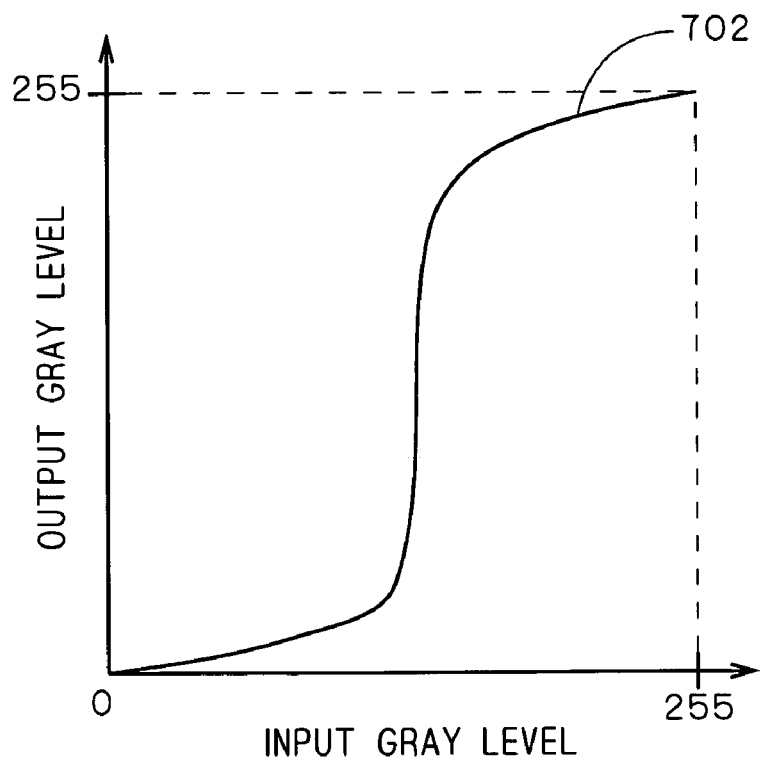
FIG. 15 is a drawing that explains the gray level transformation curve.
Figure 16:
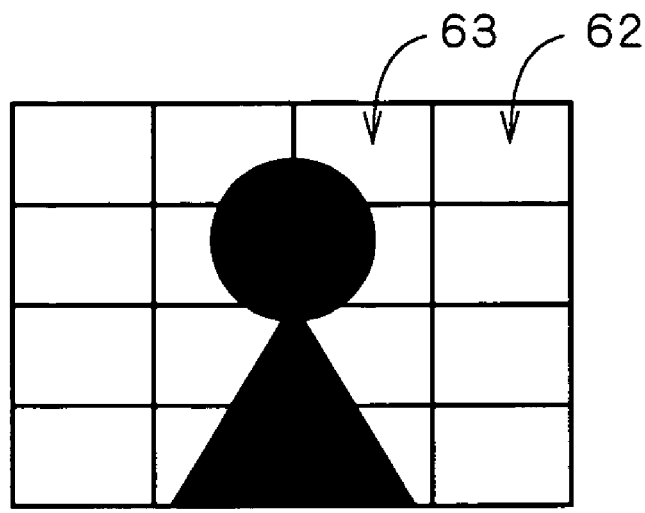
FIG. 16 is a drawing that shows unit regions with a smaller size.

FIGS. 13 through 15 are drawings that correspond to FIGS. 9 through 11, and FIGS. 13 and 14 are drawings that show states of a transformation of a gray level histogram in the case of a clip value greater than that of FIG. 9. In other words, in the gray level histogram 503 in FIG. 13, the area of a region 513 exceeding a clip value is set to be equal to the area of a region 514 of the gray level histogram 504 in FIG. 14.

In the case when the clip value is great, the area of the region 513 becomes smaller than the region 511 shown in FIG. 9, and as illustrated in FIG. 15, the accumulated histogram 702 of the gray level histogram 504 forms a curve that has an abrupt maximum inclination as shown in FIG. 15. Therefore, when the gray level transformation curve shown in FIG. 15 is used to carry out a gray level transformation, the degree of contrast emphasis becomes higher as compared with a case in which the gray level transformation curve shown in FIG. 11 is used to carry out a gray level transformation. In this manner, in general, the greater the clip value, the higher the degree of contrast emphasis.

Moreover, as described earlier, the clip value (that is, the amount of contrast corrections is determined by the contrast correction amount determining section 203 based upon the scene information and the image data. The scene information includes underexposure, overexposure, low contrast, high contrast, etc., and in general, in the case of an image from which any piece of scene information is obtained, since there is a bias on the distribution of the gray levels, the image is subjected to low contrast partially or entirely. Therefore, in the case when any of those pieces of scene information is obtained, an amount of contrast correction which is greater than that of a normal image is determined by the contrast correction amount determining section 203.

In the case of scene information for which an amount of contrast correction greater than that of the normal image has to be determined, the region size determining section 204 determines the size of the unit region so as to be greater than that of the normal image.

Figure 17:
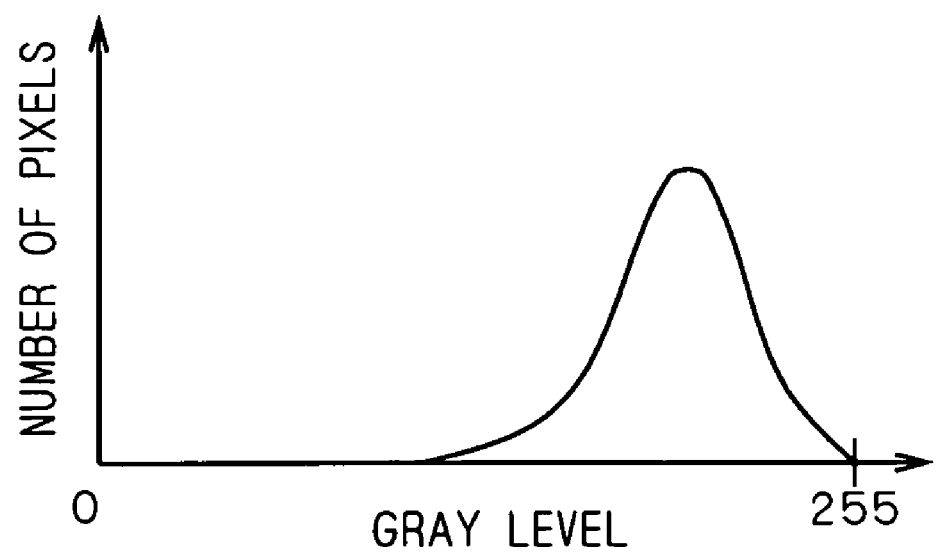
FIG. 17 is a drawing that shows a gray level histogram in a unit region.
Figure 18:
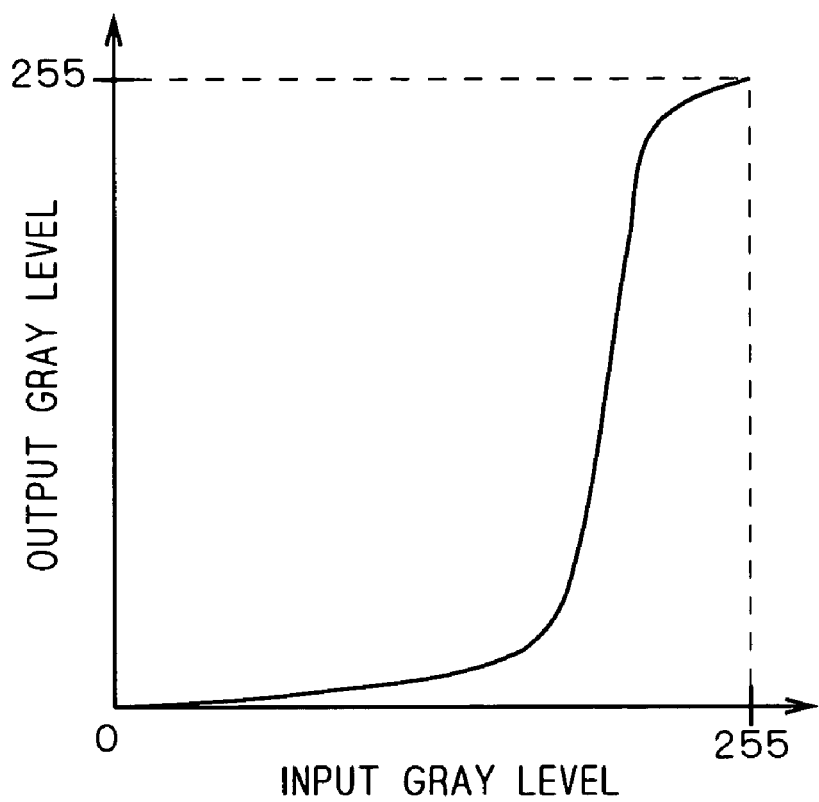
FIG. 18 is a drawing that shows a gray level transformation curve in the unit region.

FIGS. 16 through 20 explain problems that arise in the case when, although the amount of contrast correction has been increased, the size of the unit region is maintained as it is. In the image shown in FIG. 16, the unit region 62 is set as a region including only the background, and when the gray level histogram is generated, the resulting histogram has a biased portion on the highlighted side as illustrated in FIG. 17. Therefore, the resulting gray level transformation curve is given as a curve having a maximum inclination on the highlighted side approximately shown in FIG. 18.

Figure 19:
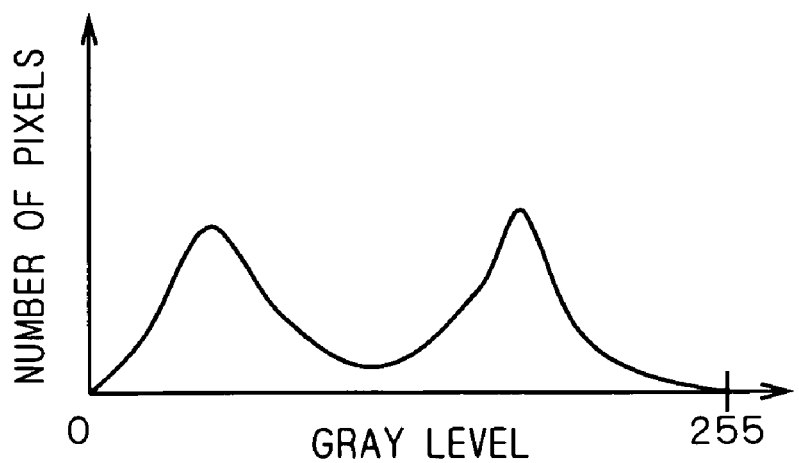
FIG. 19 is a drawing that shows a gray level histogram in another unit region.
Figure 20:
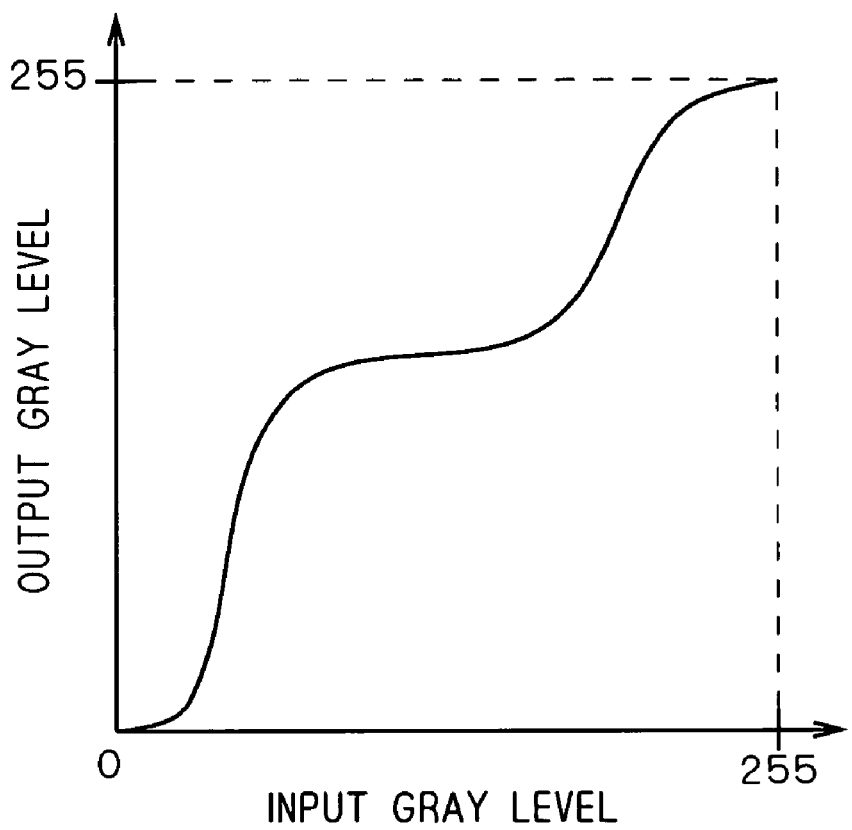
FIG. 20 is a drawing that shows a gray level transformation curve in another unit region.

In contrast, the unit region 63 is set as a region including the background and a main subject part, and when the gray level histogram is generated, the resulting histogram has a plurality of peaks as shown in FIG. 19. Therefore, the resulting gray level transformation curve is given as a curve approximately shown in FIG. 20, which is greatly different from that of FIG. 18.

Figure 21:
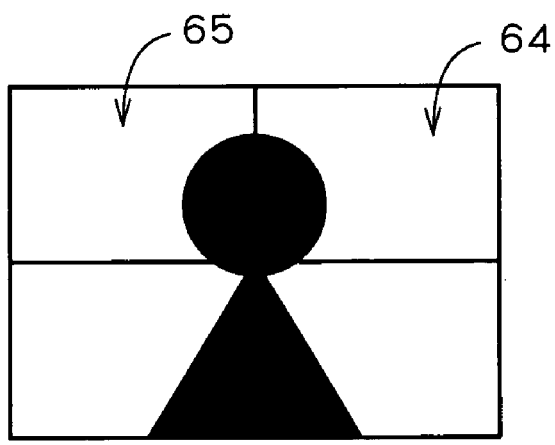
FIG. 21 is a drawing that shows unit regions with a larger size.

As illustrated in FIG. 21, in the case when the size of the unit region is increased, since the background and the main subject part are contained in both of a unit region 64 and a unit region 65 in FIG. 21, the difference in the gray level transformation curves derived from these unit regions becomes smaller. In other words, as the unit region is increased, the gray level transformation curve is derived from image information of a wider range so that the difference in the gray level transformation curves of the respective unit regions is reduced.

As described above, the difference in the gray level transformation curves (that is, transformation characteristics) between the unit regions becomes more conspicuous as the size of the unit region becomes smaller. Moreover, in general, the difference becomes more conspicuous as the amount of contrast correction (clip value) becomes greater. Therefore, in the case when, although the amount of the contrast correction is increased so as to carry out a contrast correction to which even detailed parts of an image are reflected, the size of the unit regions is still maintained at the same size as a normal image, a problem arises that gray levels are greatly different on both sides of the borders among the unit regions (that is, unevenness in gray levels in the image becomes conspicuous).

Therefore, in the contrast correcting apparatus 1 in accordance with the present preferred embodiment, in the case when any scene information that makes the amount of contrast correction greater is obtained, the region size determining section 204 determines a greater size as the size of the unit regions. As a result, it becomes possible to properly reduce unevenness in the gray levels.

For example, in the case when, in a normal amount of contrast correction, a size of pixels of 64×64 is used as the size of the unit regions, and in the case of a greater amount of contrast correction, the size of the unit regions is set to a size of pixels of 128×128. In the case of a further greater amount of contrast correction, the size of the unit regions is set to a size of pixels of 256×256. In this manner, the size of the unit regions is increased as the amount of contrast correction becomes greater.

2. Second Preferred Embodiment

In the first preferred embodiment, the scene information is determined based upon the distribution of the gray level histogram of an image; and in the second preferred embodiment, an explanation will be given of a case in which another scene information is utilized.

Figure 22:
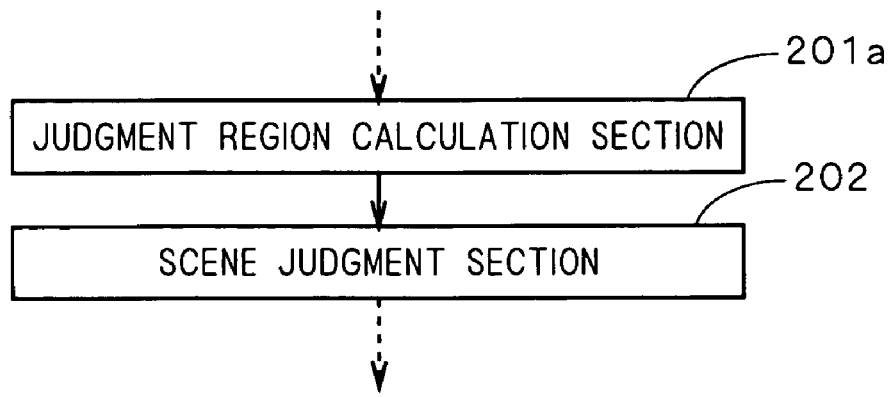
FIG. 22 is a block diagram that shows one portion of functional components of a contrast correcting apparatus in accordance with the second preferred embodiment.
Figure 23:
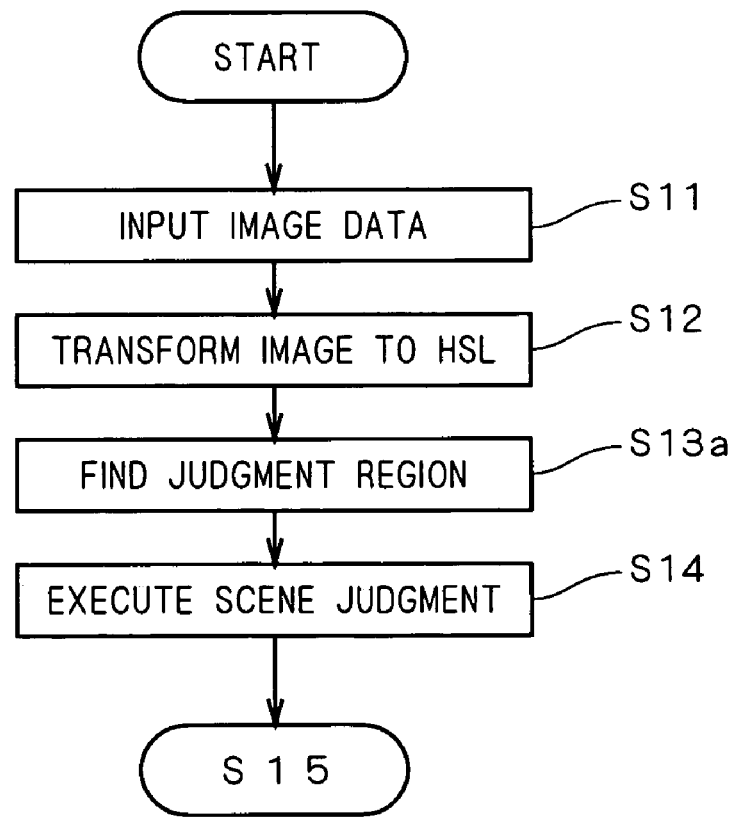
FIG. 23 is a drawing that shows one portion of the operation of the contrast correcting apparatus in accordance with the second preferred embodiment.

FIG. 22 is a block diagram that shows one portion of functional components of a contrast correcting apparatus 1 in accordance with the second preferred embodiment, and FIG. 23 is a flow chart that shows one portion of the operation of the contrast correcting apparatus 1. Here, FIGS. 22 and 23 correspond to portions of FIGS. 3 and 4 in the first preferred embodiment, and the contrast correcting apparatus 1 in accordance with the second preferred embodiment has the same arrangement as that of the first preferred embodiment, except that the gray level histogram calculation section 201 in FIG. 3 is replaced by a judgment region calculation section 201a and that the step S13 in FIG. 4 is replaced by a step S13a.

In the second preferred embodiment, after the pixel values of an input image have been transformed to HSL values by the judgment region calculation section 201a (step S12), an extraction for the judgment region is carried out so as to make a judgment on the scene (step S13a). The judgment region is found as a region where pixels having gray levels within a predetermined range exist, or as a region where pixels having hues within a predetermined range exist. Then, based upon the judgment region thus found, the scene judgment section 202 carries out a scene judgment, thereby specifying scene information (step S14). Thereafter, in the same manner as the first preferred embodiment, the amount of contrast correction and the size of the unit regions are determined based upon the scene information, and the contrast correction is carried out for each of the unit regions (FIG. 4: steps S15 to S17, FIG. 5: steps S21 to S27).

In the scene judgment (step S14), for example, in the case when regions having gray levels higher than a predetermined gray level are located on the periphery of an image and regions having gray levels lower than the predetermined gray level are located in the center of the image, it is judged that the image in question has been picked up under a condition of back light. Moreover, in the case when regions having gray levels lower than the predetermined gray level are located all over the image, it is judged that the image is a night view.

With respect to hues, they are also utilized for the scene judgment in the same manner, and for example, in the case when a great region is biased on red color to yellow color, it is judged that the image shows an evening glow, and in the case when a great region having the same color is located in the center, it is judged that the image is a close-up shooting of a face, etc.

In this manner, the scene judgment is carried out by extracting a judgment region in which the values of predetermined color element, such as gray levels and hues (or saturation, RGB values, $L^*a^*b^*$ values, etc.) are located within a predetermined range. In particular, in the case when the judgment region is great, this indicates that a region having substantially the same gray level, hue, etc. (a so-called solid region) is great, and in this type of images, when the size of the unit regions is decreased, the difference in gray level transformation curves between the unit regions appears as unevenness in gray levels in a conspicuous manner.

Therefore, in the contrast correcting apparatus 1, when any scene information such as back light, night view, evening glow and close-up shooting is directed based upon the sizes of various judgment regions, the region size determining section 204 is allowed to set the size of the unit regions to a greater size, independent of the amount of contrast correction.

Here, in the case of back light, the image is more susceptible to low contrast partially; therefore, upon receipt of scene information indicating back light, a greater value is set as the amount of contrast correction by the contrast correction amount determining section 203.

Moreover, in the above-mentioned operation, the size of the unit regions is increased in accordance with the scene information directed from the size and state of a judgment region; however, the size of the judgment region and the size of the unit regions may be directly correlated with each other. For example, the size of the judgment region is utilized as an index that shows the degree of back light, night view, evening glow and close-up shooting, and as the judgment region is increased, the size of the unit regions may be increased.

3. Third Preferred Embodiment

In the first and second preferred embodiments, the scene information is automatically directed from an image state; however, the scene information may be preliminarily provided as information for specifying a state of an image. The following description will discuss the third preferred embodiment in which the scene information is preliminarily provided.

Figure 24:
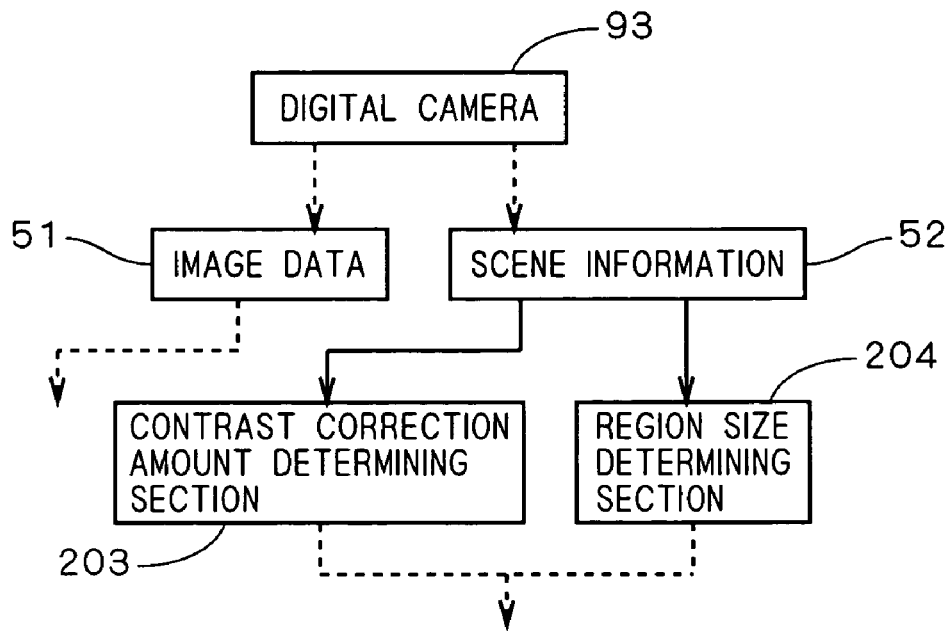
FIG. 24 is a block diagram that shows one portion of functional components of a contrast correcting apparatus in accordance with the third preferred embodiment.
Figure 25:
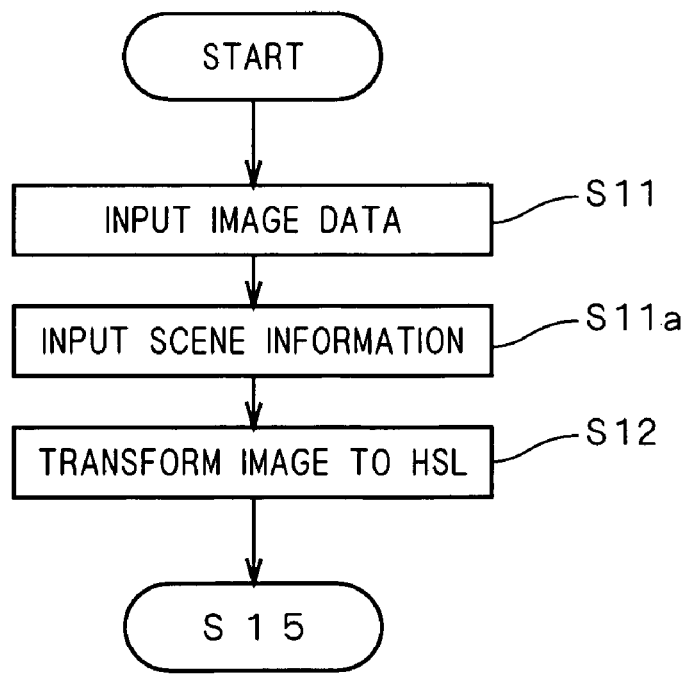
FIG. 25 is a drawing that shows one portion of the operation of the contrast correcting apparatus in accordance with the third preferred embodiment.

FIG. 24 is a block diagram that shows one portion of functional components of a contrast correcting apparatus 1 in accordance with the third preferred embodiment, and FIG. 25 is a flow chart that shows one portion of the operation of the contrast correcting apparatus 1. FIG. 24 shows a state in which the gray level histogram calculation section 201 and the scene judgment section 202, shown in FIG. 3, are omitted; and FIG. 25 shows a state in which step S13 and step S14, shown in FIG. 4, are omitted, and step S11a is added thereto. Other arrangements and operations are the same as those shown in the first preferred embodiment.

As illustrated in FIG. 24, in the third preferred embodiment, image data together with scene information are supplied to the contrast correction amount determining section 203 and the region size determining section 204 from the digital camera 93 (steps S11, S11a). The image data is supplied to the gray level transformation curve forming section 205 where it is transformed to HSL values (step S112).

In the contrast correction amount determining section 203, the scene information (and image data, if necessary) is used to determine the contrast correction amount (FIG. 4: step S15). Moreover, in the region size determining section 204, based upon the scene information given from the digital camera 93, the size of the unit regions is determined (step S16). After the image is divided, in the same manner as the first preferred embodiment, the gray level transformation curves are formed for the respective unit regions, thereby carrying out the correction of the image contrast (step S17, FIG. 5: steps S21 to S27).

Here, scene information to be given to the contrast correcting apparatus 1 from the digital camera 93 is mainly classified into two types. One type includes pickup conditions of the digital camera 93 at the time of picking up an image, such as an exposure value (a shutter speed and a diaphragm value), automatic ON/OFF of flash and a light metering sensor value, and the other type includes information input into the digital camera 93 by the operator, such as photographing modes including landscape mode, night view mode, room mode, etc., a fixed exposure value, forced ON/OFF of flash. Although some of these are substantially common items, these are different in that the former is scene information determined at the time of an image pickup (or after an image pickup), while the latter is scene information that has been preliminarily determined before an image pickup.

Here, for example, in the case when the exposure value is greater than the light metering sensor value, the region size determining section 204 sets a greater size as the size of the unit regions, or upon receipt of a night view mode, it sets a greater size as the size of the unit regions.

In this manner, by utilizing information related to an image pickup operation that is transmitted from the digital camera 93 as the scene information, it is possible to realize a proper contrast correction.

In the example shown in FIG. 24, an explanation will be given of a case in which the scene information is transmitted from the digital camera 93; however, the operator may set scene information such as underexposure, overexposure, low contrast, high contrast, etc. on the contrast correcting apparatus 1 through a key board 11a and a mouse 11b while viewing an image displayed on the display 91. In this case, not only for images obtained from the digital camera 93, but also for images obtained through a scanner or computer communications, the size of the unit regions is determined based upon the scene information, thereby making it possible to realize a proper contrast correction.

4. Modified Examples

The above description has discussed the preferred embodiments, and these preferred embodiments may be modified to various forms.

For example, in the above-mentioned preferred embodiment, an accumulated histogram related to the gray level values of the unit region is utilized as gray level transformation curve; however, as is disclosed in "Fast Adaptive Contrast Enhancement Method for the Display of Gray-Tone images" (The Institute of Electronics, Information and Communication Engineers, Journal of reports, D-II, vol. J77-D-II, No. 3, pp. 502–509, 1994/3) written by Naoki Kobayashi, et al., a selection may be made from preliminarily provided gray level transformation curves based upon the average gray level of the unit region.

The alteration of the amount of contrast correction may be made by simply altering the state of the gray level transformation curve. In this case, the degree at which the high lighted portion is raised and the shadow portion is lowered in the gray level transformation curve corresponds to the amount of contrast correction. Moreover, the contrast correction may be carried out by increasing the difference between the maximum value and the minimum value of the gray levels, and in this case, the amount of alteration of the difference between the maximum value and the minimum value of the gray levels corresponds to the amount of contrast correction.

The amount of contrast correction is not necessarily set to the same value for the respective unit regions; and for example, in the case of back light, the amount of contrast correction may be increased only in the center portion thereof.

The size and shape of the unit region are not intended to be limited by the above-mentioned preferred embodiments; and any method may be used as long as the contrast is corrected for each of the unit regions.

In the above-mentioned first and second preferred embodiments, upon determining the scene information from the gray level histogram, the pixel values are transformed to HSL values; however, they may be transformed to other values (for example, $L^*a^*b^*$ values) that can specify the gray level values. In the first preferred embodiment, the histogram by which the scene information is directed is not limited to the gray level histogram; and a saturation histogram, a hue histogram, or histograms for the respective RGB values, etc. may be used. For example, scenes such as evening glow and night view can be judged by using a hue histogram.

In the above-mentioned preferred embodiments, the contrast correction program 131 is installed in the computer 10 from the recording medium 8; however, the recording medium 8 is not limited to a portable recording medium, and a fixedly installed recording device such as a fixed disk may be used. The recording device may be connected to the computer 10 through a communication network such as the Internet.

In the above-mentioned preferred embodiment, an explanation was given of a case in which the computer 10 is mainly allowed to function as the contrast correcting apparatus 1; however, the entire functional components or a portion of them shown in FIG. 3 may be constituted as a dedicated electrical circuit. Moreover, the program 131, in cooperation with another program, may allow the computer 10 to function as the contrast correcting apparatus 1.

While the invention has been shown and described in detail, the foregoing description is in all aspects illustrative and not restrictive. It is therefore understood that numerous modifications and variations can be devised without departing from the scope of the invention.

What is claimed is:

1. A computer-readable medium carrying a program for correcting a contrast of an image, wherein execution of said program by a computer causes said computer to perform a process comprising the steps of:
    determining a size of unit regions each of which is a unit for correcting said contrast of said image;
    dividing said image into a plurality of unit regions in accordance with said size of unit regions;
    obtaining a plurality of gray level transformation characteristics, each gray level transformation characteristic individually corresponding to a different one of said plurality of unit regions; and
    correcting the contrast of each said unit region by individually using said respective gray level transformation characteristic individually corresponding to said unit region.

2. The computer-readable medium of claim 1, wherein said size of unit regions is determined on the basis of distribution of a gray level histogram generated from said image.

3. The computer-readable medium of claim 1, wherein said size of unit regions is determined on the basis of pickup conditions at the time of picking up said image.

4. The computer-readable medium of claim 1, wherein said size of unit regions is determined on the basis of information input by an operator.

5. The computer-readable medium of claim 1, wherein said size of unit regions is increased as an amount of contrast correction of said image becomes greater.

6. The computer-readable medium of claim 1, wherein said size of unit regions is determined on the basis of a size of a region in which values of a predetermined color element are located within a predetermined range.

7. A method of correcting a contrast of an image comprising the steps of:
    determining a size of unit regions each of which is a unit for correcting said contrast of said image;
    dividing said image into a plurality of unit regions in accordance with said size of unit regions;
    obtaining a plurality of gray level transformation characteristics, each gray level transformation characteristic individually corresponding to a different one of said plurality of unit regions; and
    correcting contrasts of each said unit region by individually using said gray level transformation characteristic individually corresponding to said unit region.

8. The method of claim 7, wherein said size of unit regions is determined on the basis of distribution of a gray level histogram generated from said image.

9. The method of claim 7, wherein said size of unit regions is determined on the basis of pickup conditions at the time of picking up said image.

10. The method of claim 7, wherein said size of unit regions is determined on the basis of information input by an operator.

11. The method of claim 7, wherein said size of unit regions is increased as an amount of contrast correction of said image becomes greater.

12. The method of claim 7, wherein said size of unit regions is determined on the basis of a size of a region in which values of a predetermined color element are located within a predetermined range.

13. An apparatus for correcting a contrast of an image comprising:
    means for determining a size of unit regions each of which is a unit for correcting said contrast of said image;
    means for dividing said image into a plurality of unit regions in accordance with said size of unit regions and obtaining a plurality of gray level transformation characteristics, each gray level transformation characteristic individually corresponding to a different one of said plurality of unit regions; and
    means for correcting contrasts of each said unit region by individually using said individually corresponding gray level transformation characteristic.

14. The apparatus of claim 13, wherein
said size of unit regions is determined on the basis of distribution of a gray level histogram generated from said image.
15. The apparatus of claim 13, wherein
said size of unit regions is determined on the basis of pickup conditions at the time of picking up said image.
16. The apparatus of claim 13, wherein
said size of unit regions is determined on the basis of information input by an operator.
17. The apparatus of claim 13, wherein
said size of unit regions is increased as an amount of contrast correction of said image becomes greater.
18. The apparatus of claim 13, wherein
said size of unit regions is determined on the basis of a size of a region in which values of a predetermined color element are located within a predetermined range.
19. An apparatus for correcting a contrast of an image comprising:
a region size determining section for determining a size of unit regions each of which is a unit for correcting said contrast of said image;
a gray level transformation section for dividing said image into a plurality of unit regions in accordance with said size of unit regions and obtaining a plurality of gray level transformation, each gray level transformation characteristic individually corresponding to a different one of said plurality of unit regions; and
a contrast correction section for correcting contrasts of each of said of unit regions by individually using said individually corresponding gray level transformation characteristics.

* * * * *